US012191452B2

United States Patent
Liu et al.

(10) Patent No.: US 12,191,452 B2
(45) Date of Patent: Jan. 7, 2025

(54) SCALABLE 3D LITHIUM METAL ANODE

(71) Applicant: THE REGENTS OF THE UNIVERSITY OF CALIFORNIA, Oakland, CA (US)

(72) Inventors: Ping Liu, La Jolla, CA (US); Haodong Liu, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 457 days.

(21) Appl. No.: 17/033,186

(22) Filed: Sep. 25, 2020

(65) Prior Publication Data

US 2021/0091413 A1  Mar. 25, 2021

Related U.S. Application Data

(60) Provisional application No. 62/905,971, filed on Sep. 25, 2019.

(51) Int. Cl.
*H01M 10/0568* (2010.01)
*H01M 4/04* (2006.01)
(Continued)

(52) U.S. Cl.
CPC ..... *H01M 10/0568* (2013.01); *H01M 4/0404* (2013.01); *H01M 4/0409* (2013.01);
(Continued)

(58) Field of Classification Search
None
See application file for complete search history.

(56) References Cited

U.S. PATENT DOCUMENTS

| | | | |
|---|---|---|---|
| 2017/0373351 A1* | 12/2017 | Kawai | H01M 10/26 |
| 2020/0365892 A1* | 11/2020 | Han | H01M 4/134 |
| 2021/0111389 A1* | 4/2021 | Doi | H01G 11/06 |

OTHER PUBLICATIONS

Cheng et al. "Toward safe lithium metal anode in rechargeable batteries: a review." Chemical reviews 117.15 (2017): 10403-10473.

(Continued)

*Primary Examiner* — Wyatt P McConnell
(74) *Attorney, Agent, or Firm* — Sheppard, Mullin, Richter & Hampton LLP

(57) ABSTRACT

A rechargeable battery device, specifically a scalable 3D lithium metal anode, and a method of manufacturing the same is disclosed. The scalable 3D electrode can serve as a lithium (Li) metal host that enables stable lithium metal cycling. Furthermore, the electrode can be fabricated by coating a slurry of well mixed $LiNO_3$, carbon black, and PVDF on a Cu foil. For example, a 3D electrode can include a binder and a plurality of additives, wherein the plurality of additives comprise at least one conductive additive and at least one solid electrolyte interface (SEI) formation additive. The conductive additive can include electronic conductors, where the conductors are selected from a group consisting of carbon black, carbon nanotubes, carbon fibers, vapor grown carbon fiber (VGCF), graphite, and graphene. The SEI formation additives are selected from a group consisting of $LiNO_3$, $RbNO_3$, $KNO_3$, $CsNO_3$, LiFSI, $LiAsF_6$, LiF, $Li_2O$, $Li_2CO_3$, $Li_3PO_4$, $SiO_2$, and $Li_3N$.

11 Claims, 14 Drawing Sheets

(51) Int. Cl.
    H01M 4/134      (2010.01)
    H01M 4/1395     (2010.01)
    H01M 4/38       (2006.01)
    H01M 4/505      (2010.01)
    H01M 4/525      (2010.01)
    H01M 4/58       (2010.01)
    H01M 4/62       (2006.01)
    H01M 4/66       (2006.01)
    H01M 10/0525    (2010.01)
    H01M 10/0567    (2010.01)
    H01M 10/0569    (2010.01)
    H01M 10/058     (2010.01)
    H01M 4/02       (2006.01)

(52) U.S. Cl.
    CPC ......... *H01M 4/0445* (2013.01); *H01M 4/134* (2013.01); *H01M 4/1395* (2013.01); *H01M 4/382* (2013.01); *H01M 4/505* (2013.01); *H01M 4/525* (2013.01); *H01M 4/5825* (2013.01); *H01M 4/62* (2013.01); *H01M 4/623* (2013.01); *H01M 4/625* (2013.01); *H01M 4/663* (2013.01); *H01M 4/667* (2013.01); *H01M 10/0525* (2013.01); *H01M 10/0567* (2013.01); *H01M 10/0569* (2013.01); *H01M 10/058* (2013.01); *H01M 2004/021* (2013.01); *H01M 2004/027* (2013.01); *H01M 4/661* (2013.01); *H01M 2300/0034* (2013.01); *H01M 2300/0037* (2013.01); *Y02E 60/10* (2013.01)

(56) References Cited

OTHER PUBLICATIONS

Ke et al. "Hierarchically bicontinuous porous copper as advanced 3D skeleton for stable lithium storage." ACS applied materials & interfaces 10.16 (2018): 13552-13561.

Ren et al. "Guided lithium metal deposition and improved lithium coulombic efficiency through synergistic effects of LiAsF6 and cyclic carbonate additives." ACS Energy Letters 3.1 (2017): 14-19.

* cited by examiner

SCALABLE 3D LITHIUM METAL ANODE

REFERENCE TO RELATED APPLICATIONS

The present application claims priority to U.S. Provisional Patent Application No. 62/905,971, filed Sep. 25, 2019 and titled "SCALABLE 3D LITHIUM METAL ANODE," which is incorporated herein by reference in its entirety.

STATEMENT OF RIGHTS TO INVENTIONS MADE UNDER FEDERALLY SPONSORED RESEARCH

This invention was made with government support under DE-EE0007764 awarded by Department of Energy. The government has certain rights in the invention.

TECHNICAL FIELD

The disclosed technology relates generally to the field of rechargeable batteries. In particular, some embodiments of the disclosed technology relate to enhanced multi-functional 3D electrodes for dendrite-free and increased coulombic efficiency lithium metal anodes.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
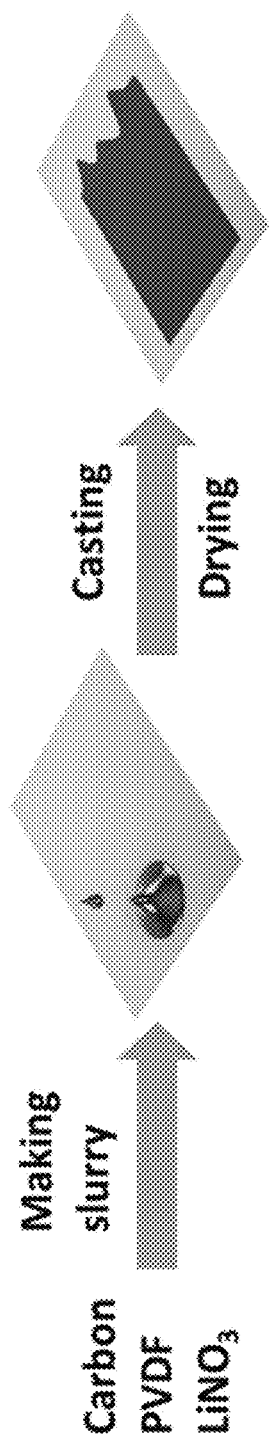
FIG. 1A provides an example process of making the 3D composite host, in accordance with various embodiments.

The figures are not intended to be exhaustive or to limit the embodiments to the precise form disclosed. It should be understood that all embodiments can be practiced with modification and alteration, and that the disclosed technology be limited only by the claims and the equivalents thereof.

DETAILED DESCRIPTION OF THE EMBODIMENTS

Various embodiments of the presently disclosed technology may be directed to developing a scalable 3D electrode to serve as a lithium (Li) metal host that enables stable lithium metal cycling. The electrode can be fabricated by coating a slurry of well mixed $LiNO_3$, carbon black, and PVDF on a Cu foil. The pores in the electrode may serve as lithium metal hosts while the $LiNO_3$ particles can act both as a structural skeleton and an electrolyte additive. Micron-level dense Li chunks may be deposited into the 3D electrode at a current density of 2 mA $cm^{-2}$. Moreover, high coulombic efficiencies of 98.4% and 97.1% can be achieved in carbonate-based electrolytes at current densities of 0.25 mA $cm^{-2}$ and 2 mA $cm^{-2}$, respectively. In one example embodiment, the 3D electrode is tested in an anode free cell with $LiFePO_4$, which exhibits a good capacity retention of 49.1% after 100 cycles and correspond to an average efficiency of 99.3% per cycle. Accordingly, the presently disclosed technology can provide a facile and scalable method to fabricate multi-functional 3D electrodes for dendrite-free and high coulombic efficiency Li metal anodes.

Li metal anode is currently being extensively studied to replace graphite in order to further raise the energy density of rechargeable batteries. Li metal anode, however, has been plagued by several well-known issues. Dendritic Li formation during repeated Li plating and stripping results in ever increasing surface area and may short the cell over time and cause safety issues. The loose deposition of Li anode also results in large volume expansion. Perhaps the most challenging is the low coulombic efficiency. The continuous loss of active lithium does not satisfy the requirement of long cycling life when limited Li is used in order to achieve high energy density. A review of these challenges has revealed the root causes are the high reactivity of Li metal and non-uniform Li ion flux.

Several approaches have been presented recently to address these challenges. In order to mitigate the lithium metal reaction with the electrolyte, research has identified ether-based electrolytes to be more stable than carbonate-based ones, resulting in higher coulombic efficiency. Unfortunately, these electrolytes have poor oxidative stability and are usually unsuitable for high voltage, oxide-based cathodes. Another widely used method is to employ electrolytes (often with additives) that promote the formation of high quality SEI formation to protect lithium metal. This method is applicable to the more oxidatively stable, carbonate-based cathodes. For example, simultaneously adding $LiAsF_6$ and cyclic carbonate into the electrolyte to generate a uniform and flexible SEI layer on the Li surface, may contribute to dendrite free Li deposition with enhanced coulombic efficiency. In order to address the large volume changes during Li plating and stripping, other approaches have introduced 3D hosts for Li metal, such as porous Cu, layered reduced graphene oxide, and carbon cloths, among others. These 3D hosts not only largely mitigate the volume changes during Li plating and stripping, but also suppress the Li dendrite growth. Although, the large surface area of the 3D host reduces the local current densities, the side reactions become more serious as well. Consequently, an effective strategy is capable of combining 3D host design with electrolyte engineering to address all the issues of the Li metal anode.

In various embodiments of the presently disclosed technology, a commercial carbonate electrolyte (1 M $LiPF_6$ in 1:1 vol ratio EC/DMC, LP30) can be chosen as the baseline. By adding vinylene carbonate (VC) and $LiNO_3$, both Li metal morphology and coulombic efficiency may be greatly improved. Later, this modified electrolyte can be combined with a novel multi-functional 3D composite host for the Li metal anode.

Figure 1B:
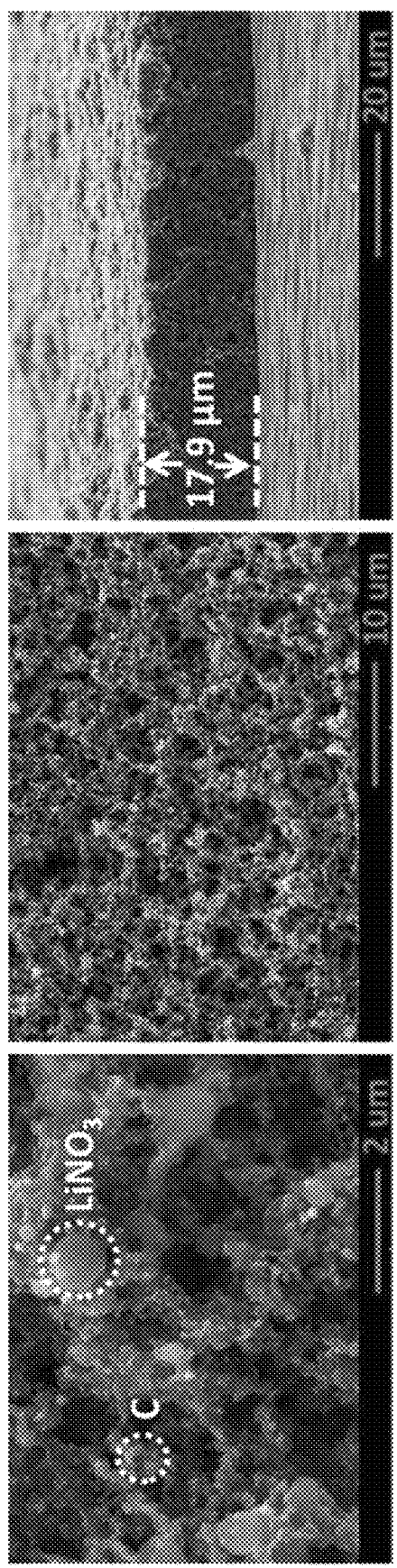
FIG. 1B depicts a sample SEM image of a 3D $LiNO_3$ composite host made from the process in FIG. 1A, in accordance with various embodiments.

FIG. 1A provides an example process of making the 3D composite host and FIG. 1B depicts a sample SEM image of a 3D $LiNO_3$ composite host made from the process, in accordance with various embodiments. Referring to FIG. 1A, the 3D composite host is prepared by casting a well mixed slurry of $LiNO_3$, carbon black, and PVDF on a Cu foil, followed by drying in the oven. As a result of the combination of electrolyte additive and 3D composite host, dense Li chunks with micron-sized particles can be observed even at a high current density of 2 mA $cm^{-2}$ after 70 cycles in a carbonate electrolyte. A high coulombic efficiency of 98.4% over 300 cycles may also be achieved at 0.25 mA $cm^{-2}$ for 0.5 mAh $cm^{-2}$. The presently disclosed technology suggests that simultaneous use of electrolyte additives and 3D hosts may enable a stable Li metal anode.

Sample Experimental Method

A. 3D Composite Electrode Preparation

In one example, the 3D composite electrode was prepared by mixing the $LiNO_3$ (Sigma-Aldrich), with 20 wt % Super P carbon (TIMCAL) and 20 wt % poly(vinylidene fluoride) (PVDF) in N-methylpyrrolidone (NMP, ACROS Organics). The slurry was cast onto a Cu foil using a doctor blade and dried in a vacuum oven overnight at 80° C. The electrode discs were punched and dried again before being storing in an argon-filled glovebox (MTI corporation).

B. Electrochemical Test

In accordance with some embodiments, battery grade vinylene carbonate (VC) may be acquired from Shenzhen CAPCHEM Technology Co. Ltd. The premixed LP30 electrolyte (1 M $LiPF_6$ in 1:1 vol ratio EC/DMC) can be purchased from BASF. 2032-type coin cells can be used for all the electrochemical studies in the presently disclosed technology. The 250 μm thick lithium can be punched to 12.5 mm discs as the counter electrode. The Celgard 25 μm trilayer PP-PE-PP membrane may be used as a separator. Galvanostatic cycling can be conducted on an LBT-5V5A battery tester (Arbin instruments). The cycled electrode may be recovered by disassembling the coin cell. All the samples can be washed with DMC three times and dried in the glovebox antechamber under vacuum.

C. Scanning Electron Microscopy

In one testing example, the morphology and thickness of the deposited Li metal film and 3D composite electrode can be characterized using scanning electron microscopy (FEI Quanta 250 SEM). The sample can be adhered to a double-sided carbon tape and placed on a specimen holder. The prepared sample can be sealed in a laminate plastic bag inside the glovebox for transferring to the SEM. The approximate time of sample exposed to air (from a sealed environment to the SEM stage) may be less than 3 seconds.

D. X-Ray Diffraction

In one testing example, the crystal structure of coating materials can be identified by X-ray diffraction (XRD), acquired using a Bruker D2 phaser diffractometer with a Bragg-Brentano θ-2θ geometry and a Cu Kα source (λ=1.54 Å). Samples were sealed inside the glovebox by Kapton tape, which may be scanned from 30° to 60° at a scan rate of 0.02° $s^{-1}$.

Results and Discussion

The coulombic efficiency of Li metal cycling depends on the electrolyte solvent. Due to its high compatibility with oxide-based cathodes, enhancing the Li stability in carbonate-based electrolytes may be performed. A commercial electrolyte (1 M $LiPF_6$ in 1:1 vol ratio EC/DMC, LP30) can chosen as a baseline electrolyte. Based on previous Si anode research, 5 wt % vinylene carbonate (VC) may be chosen as an SEI formation additive in order to improve the uniformity and flexibility of the SEI film on Li surface. The effects of VC additive on Li metal coulombic efficiency (CE) can be studied by testing Li—Cu coin cells. Li may be plated on Cu substrate at 0.5 mA $cm^{-2}$ for 1 mAh $cm^{-2}$, and then stripped at the same current density until the cell potential reached 1 V. In one sample implementation, a comparison between LP30 electrolyte (E1) and LP30+5 wt % VC electrolyte (E2) reveals the average CE over 80 cycles can be improved from 90.5% to 96.9% with the help of the VC additive.

In one embodiment, the second additive can $LiNO_3$. Previous research has shown that $LiNO_3$ is a universal electrolyte additive in Li—S batteries because it protects the Li metal and reduces the $S_n^{2-}$ shuttle by forming a layer of $Li_xNO_y$ species. The concentration of the $LiNO_3$ in ether-based electrolytes for Li—S batteries is usually higher than 0.2 M. Because of the low solubility of $LiNO_3$ in carbonates, the $LiNO_3$ has not been widely used in carbonate-based electrolytes yet. The $LiNO_3$ salt can be gradually added into the E2 until saturation; the overall concentration of $LiNO_3$ was 0.02M. This LP30+5 wt % VC+0.02 M $LiNO_3$ (E3) electrolyte can further enhance the CE of Li metal to 97.7%.

In an alternative embodiment, in addition to the coulombic efficiency (CE) test, the Li deposition morphologies can also be investigated in these electrolytes. Li can be plated on the Cu substrate at a high current density of 2 mA $cm^{-2}$ for 1 h. The Li plated in E1 is needle-like due to the loose deposition, most mossy Li is lost during cell disassembling. It may be hard to determine the thickness of the plated Li in E1 through the cross sectional view. The VC promoted Li chunk formation, however, small amounts of dendrites can also be observed in E2 at a high current density of 2 mA $cm^{-2}$. The Li chunk size distribution may range from 0.5 to 2 μm. In one example, the thickness of the Li film in E2 was 26 μm, which suggests that even though the morphology was improved, the deposition is still incompact. According to sample theoretical calculations, 2 mAh cm$^{-2}$ of Li corresponds to a thickness of 9.7 µm and the porosity of Li in E2 is 62.7%. In the case of E3, the plated Li may be all big chunks with sizes between 2 and 5 µm. The Li film can be 11.5 µm thick with a low porosity of 15.7%, which indicates a dense Li film was deposited on Cu in E3. All the morphology studies of the deposited Li are consistent with the CE testing data. The bigger Li chunk with denser deposition can deliver higher CE. The E3 can be used as the improved electrolyte for the rest of the studies.

Although electrolyte formulas are effective in improving cycling efficiency, they do not address the volume change issue during Li cycling. The 3D Li host is a promising strategy. However, the current proposed 3D Li hosts are either too complicated to fabricate, or too hard to implement into a real device. Most of the 3D Li hosts only serve as high surface area porous electrode. The presently disclosed technology can provide a multi-functional 3D composite host. The fabrication of this host is similar to the electrode making process in industry, which is schematically showed in FIG. 1. The SEM images display the porous structure of the host. The porosity of the 3D composite electrode may be calculated based on the following equation (Equation 1).

$$\text{Porosity} = (V_{electrode} - \sum V_{component})/V_{electrode}$$

$$= (V_{electrode} - M_{electrode} \cdot (P_{LN}/\rho_{LN} + P_C/\rho_C + P_{PVDF}/\rho_{PVDF}))/V_{electrode}$$

Equation 1 where $V_{component}$ and $V_{electrode}$ can represent the components and electrode volume (LiNO$_3$, PVDF, and carbon black), $M_{electrode}$ can represent mass of the electrode, and p and P can represent the density and mass fraction of the materials. The densities of the LiNO$_3$, PVDF and carbon black that can be used for calculating the porosity were 2.38, 1.76, and 2.0 g cm$^{-3}$, respectively. The mass of the electrode is 1.30 mg cm$^{-2}$, and the thickness of the host is 17.9 µm. In this example, the calculated porosity of the 3D host is 66.2%.

Figure 2:
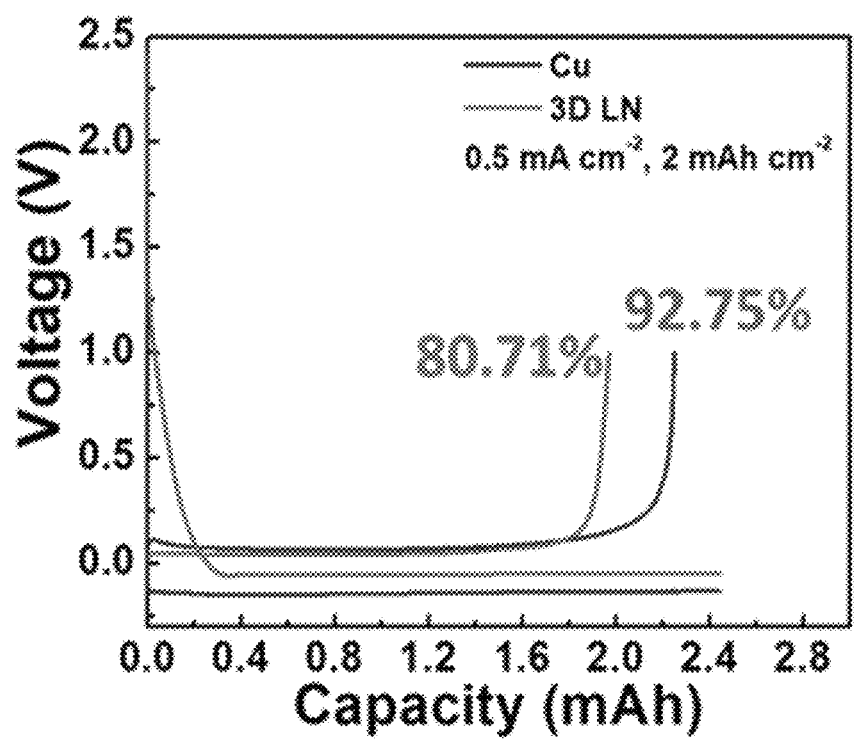
FIG. 2 illustrates an example graph comparing Li plating/stripping voltage profiles between Cu and 3D $LiNO_3$ composite electrode of a conditioning cycle, in accordance with various embodiments.
Figure 3:
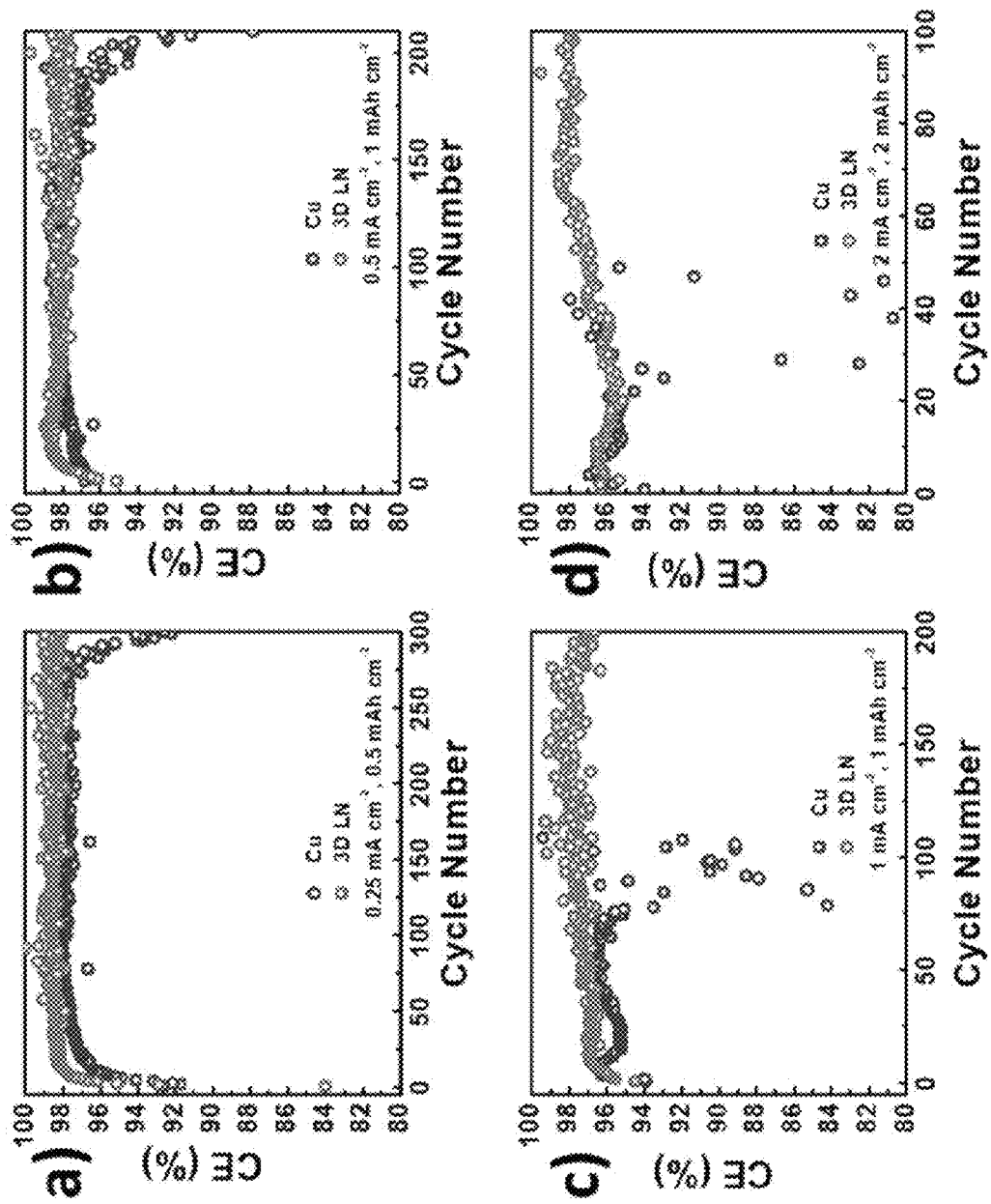
FIG. 3 illustrates example graphs comparing coulombic efficiency of different substrates, Li|Cu and Li|3D electrode cells, at various densities after respective conditioning cycles, in accordance with various embodiments.
Figure 4:
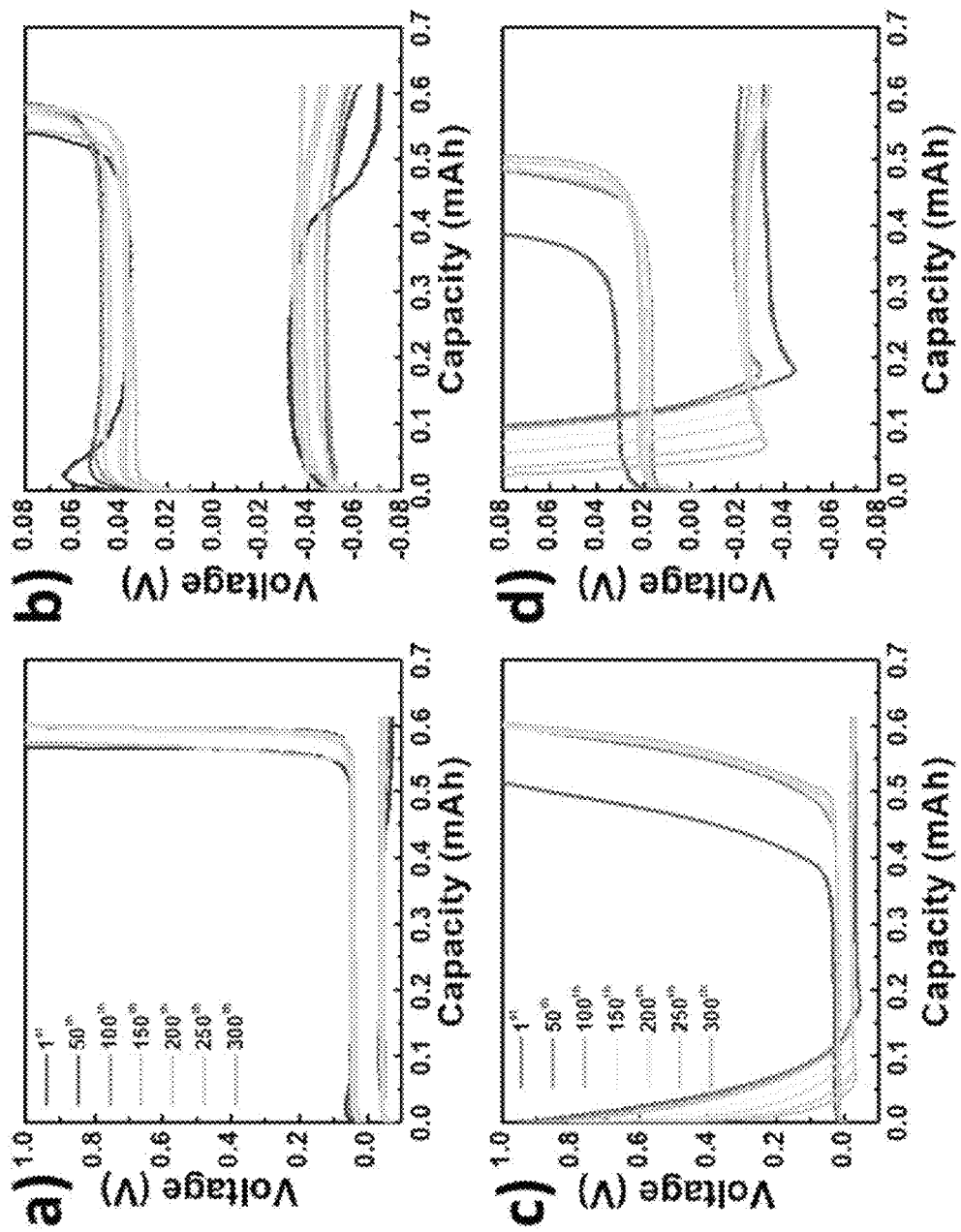
FIG. 4 illustrates example graphs comparing Li plating/stripping voltage profiles between Cu and 3D $LiNO_3$ composite electrode at various densities after respective conditioning cycles, in accordance with various embodiments.
Figure 5:
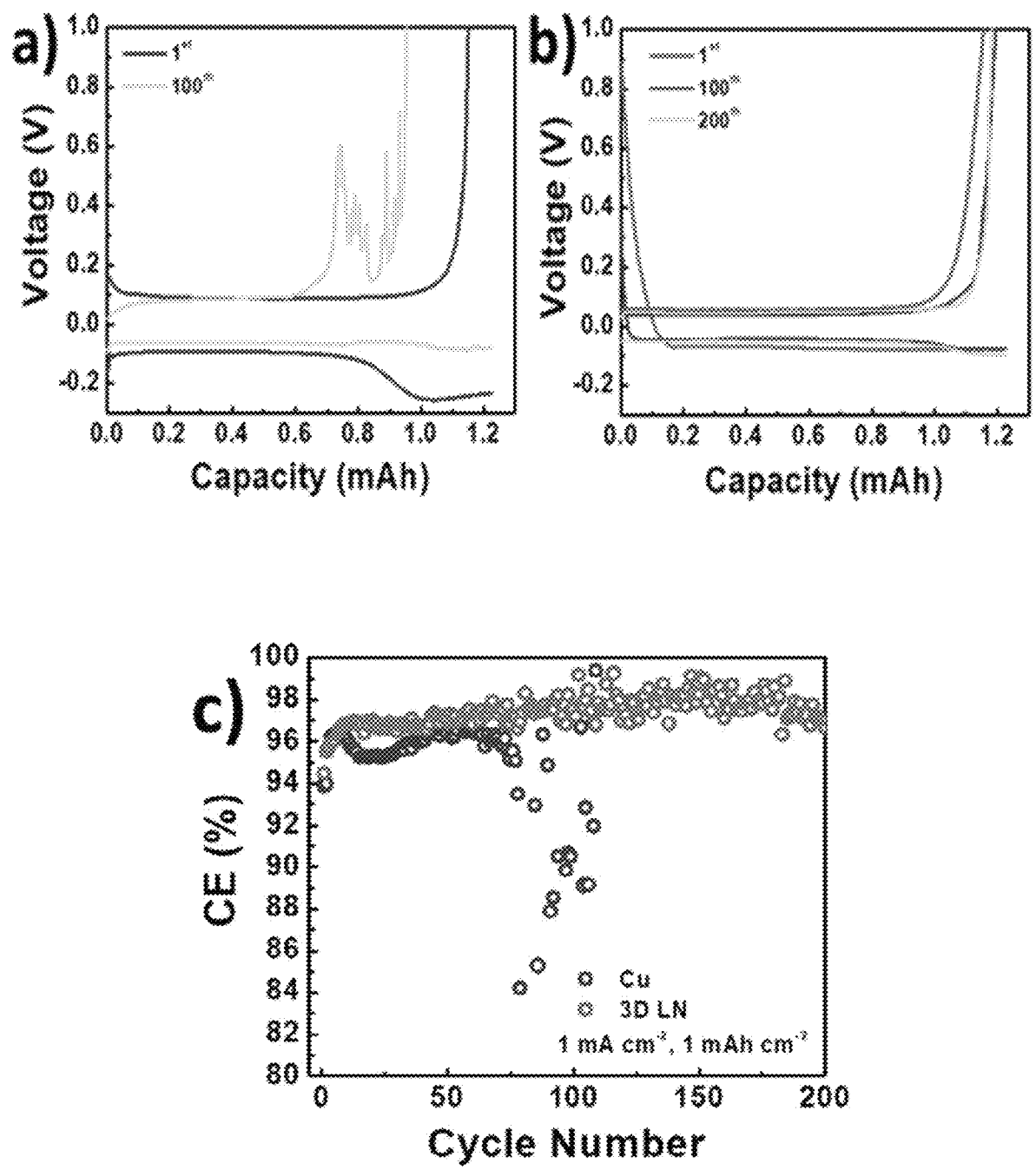
FIG. 5 illustrates example graphs of the coulombic efficiency and voltage profiles of different substrates cycled at 1 mA $cm^{-2}$ for 1 mAh $cm^{-2}$, in accordance with various embodiments.

The performance of the 3D composite host can be investigated by the CE test in E3. The bare Cu cycled in E3 can be chosen as a baseline. Both bare Cu and 3D composite host may be discharged versus Li at 0.5 mA cm$^{-2}$ for 4 h, and then the Li was stripped to 1 V at 0.5 mA cm$^{-2}$ for one cycle. FIG. 2 illustrates an example graph comparing Li plating/stripping voltage profiles between Cu and 3D LiNO$_3$ composite electrode of a conditioning cycle, in accordance with various embodiments. The conditioning cycle can form an SEI layer on the substrate. The 3D host can exhibit a much lower over-potential than the bare Cu, however, the large surface area may contribute to the higher irreversibility during this condition cycle. FIG. 3 illustrates example graphs comparing coulombic efficiency of different substrates, Li∥Cu and Li∥3D electrode cells, at various densities after respective conditioning cycles, in accordance with various embodiments. That is, FIG. 3 systematically compared CE of both substrates at various current densities after their condition cycles. In FIG. 3A, the substrates exhibited their CE at 0.25 mA cm$^{-2}$ for 0.5 mAh cm$^{-2}$. At this mild condition, both substrates can show good stability for long duration of 300 cycles. The 3D host delivered higher average CE than the bare Cu. In this example, the average CEs over 300 cycles were 97.5% and 98.4% for bare Cu and 3D host, respectively. FIG. 4 illustrates example graphs comparing Li plating/stripping voltage profiles between Cu and 3D LiNO$_3$ composite electrode at various densities after respective conditioning cycles, in accordance with various embodiments. That is, FIG. 4 shows the Li plating and stripping voltage profiles on both substrates. Furthermore, the voltage difference between the charge and discharge plateaus was only 37.2 mV on 3D host, while a large voltage difference of 69.1 mV was detected on bare Cu, in this example. This lower over-potential was attributed to the porous structure in the 3D host, which decreased the local current density. Both substrates were evaluated at harsher conditions that were close to the current densities in real batteries. When they were cycled at 1 mA cm$^{-2}$ for 1 mAh cm$^{-2}$, the bare Cu cell started to short before 80 cycles, while the 3D host showed stable Li plating and stripping over 250 cycles, in this example. FIG. 5 illustrates example graphs of the coulombic efficiency and voltage profiles of different substrates cycled at 1 mA cm$^{-2}$ for 1 mAh cm$^{-2}$, in accordance with various embodiments. That is, FIG. 5 presents substrate CEs and voltage profiles. The bare Cu achieved a CE of only 95.7% for 79 cycles. As a comparison, the 3D host delivered a high CE of 97.9%. The bare Cu cycled at 2 mA cm$^{-2}$ for 2 mAh cm$^{-2}$ presented a much lower cycle life; the Li—Cu cells were usually shorted before 20 cycles. On the other hand, the 3D host still delivered a good CE of 97.1%.

Figure 6:
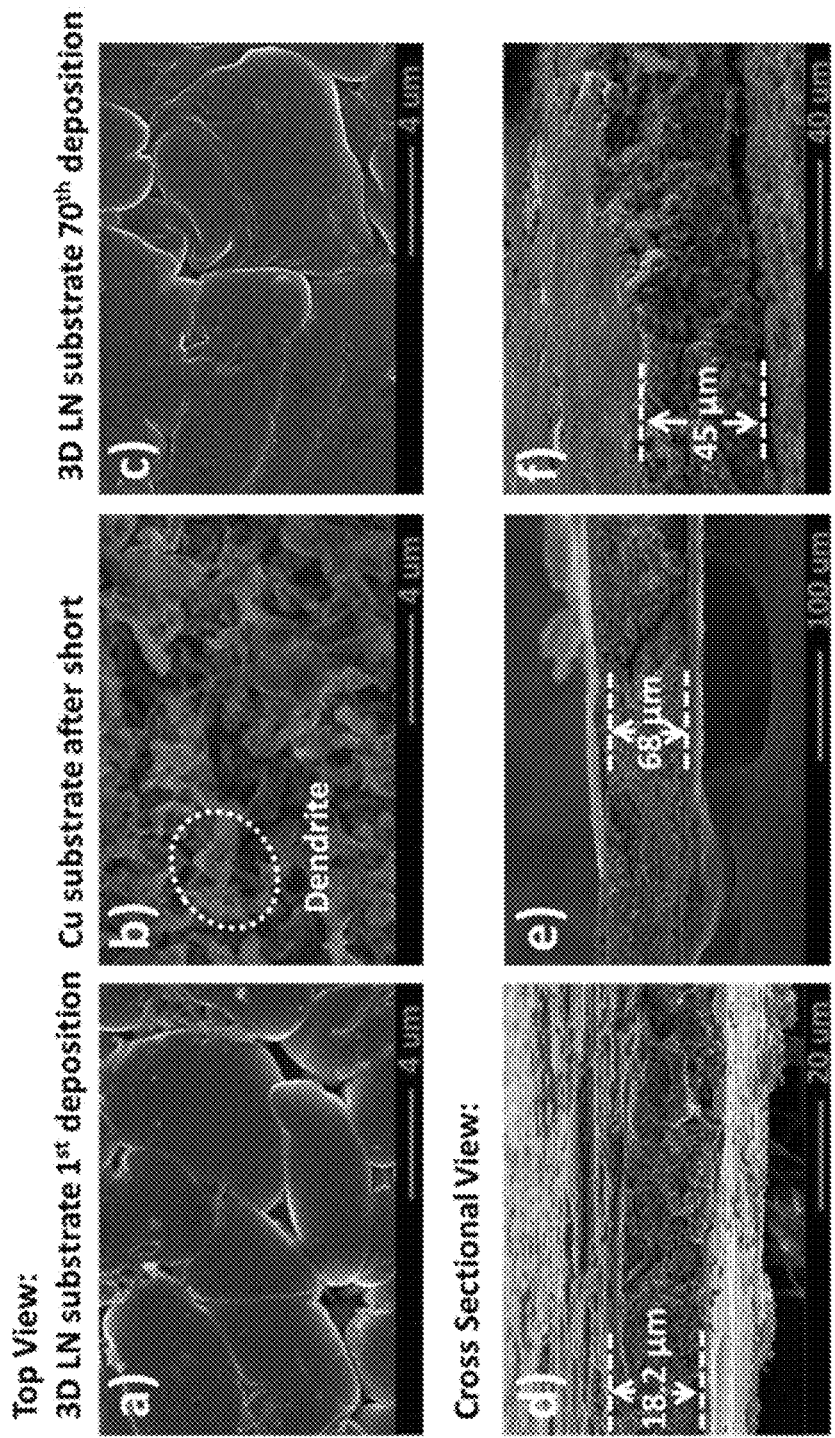
FIG. 6 depicts sample SEM images of the Li morphology deposited on various substrates, in accordance with various embodiments.

In one embodiment, the enhanced CEs can be associated with the morphology of the deposited Li. FIG. 6 depicts sample SEM images of the Li morphology deposited on various substrates, in accordance with various embodiments. That is, FIG. 6 illustrated the Li morphology on the 3D substrate. The first deposition of 2 mAh cm$^{-2}$ Li at 2 mA cm$^{-2}$ can show big chunks of Li similar to the bare Cu substrate. Because the porosity of the 17.9 µm thick 3D host was 66.2%, the pores were able to store 11.8 µm of Li metal, in this embodiment. Most of the Li was plated into the 3D host, which can fill up the pores inside the host. As a consequence, the thickness of the Li film was 18.2 µm, which was only 1.7% larger than the original 3D host, in this example. Both bare Cu substrate and 3D composite substrates can show dense Li chunks at the first deposition. However, the cells may show different performances after a few Li plating and stripping cycles at 2 mA cm$^{-2}$ for 2 mAh cm$^{-2}$. FIGS. 6B, and 6E displayed the SEM images of the 20th deposition of the Li on the Cu substrate. All the Li chunks transformed to needles after 20 cycles, and the thickness of the Li dramatically grew to 68 µm. The short life time of the Li—Cu cell in E3 can be caused by the Li dendrite formation. Meanwhile, the morphology of the Li on the 3D composite substrate at its 70$^{th}$ deposition is shown in FIG. 6C and FIG. 6F. The Li chunk morphology can be well maintained and may also grow larger. Considering the fact that the CE of the 3D host at 2 mA cm$^{-2}$ was less than 100%, there may be accumulations of irreversible Li over 70 cycles. Theoretically, if all the deposited Li were 100% dense, the irreversible Li deposition may contribute to 23.1 µm increase of the thickness. In reality, the thickness of the Li film increased to 45 µm, which is 8.9% higher than assuming completely dense depositions (18.2+23.1 um). The investigation on the evolutions of Li morphologies on different substrates may verify that the 3D host maintained the dense Li chunks after long term cycling even at high current density.

Figure 7:
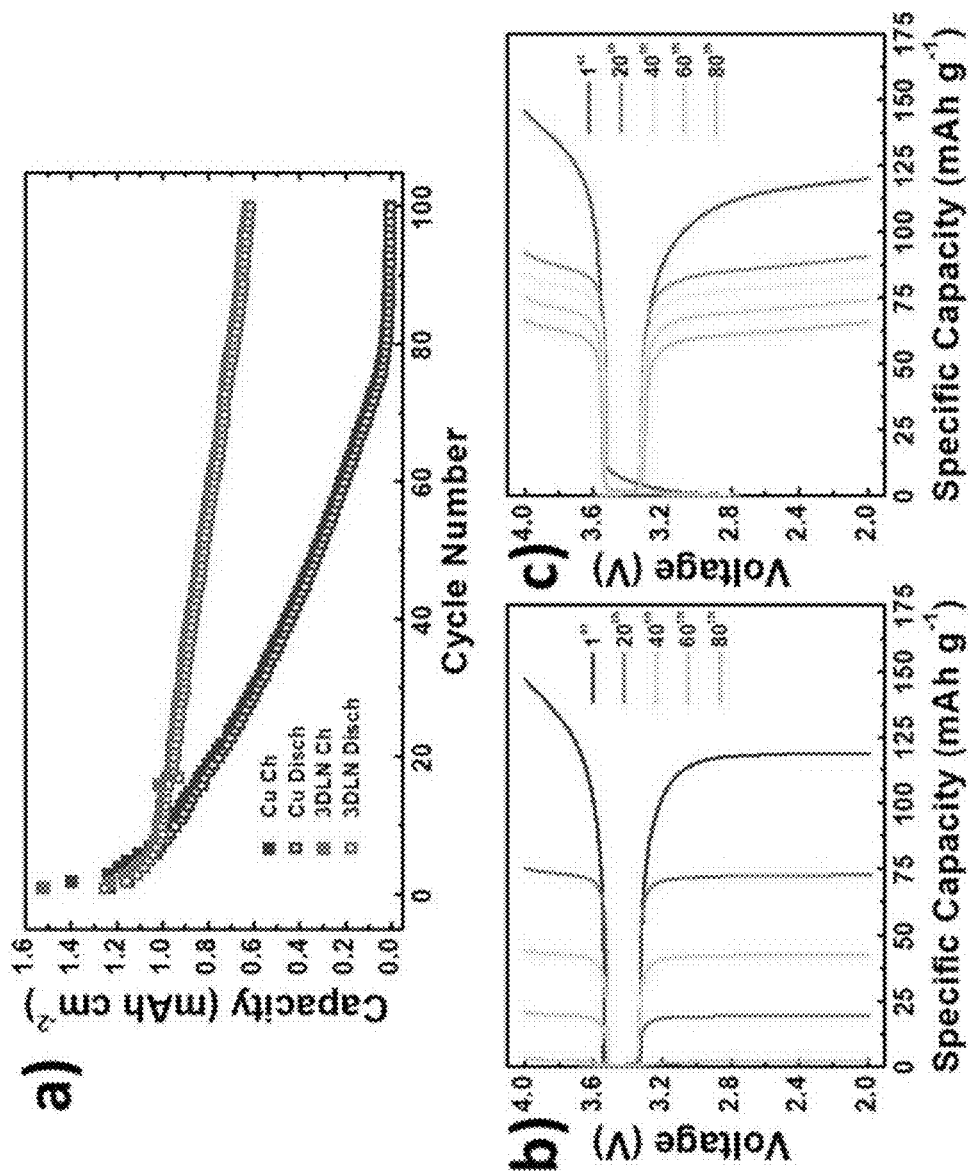
FIG. 7 illustrates example graphs comparing the performance of cells with Cu and 3D host as anode, in accordance with various embodiments.

In another embodiment, anode free cells with LiFePO4 cathode were fabricated to further evaluate the 3D host. The area capacity loading of the LiFePO4 can be 1.5 mAh cm$^{-2}$. FIG. 7 illustrates example graphs comparing the performance of cells with Cu and 3D host as anode, in accordance with various embodiments. Referring to FIG. 7, the cells may be between 2.0-4.0V at 0.5 mA cm$^{-2}$. The 3D host cell showed much higher CEs and better capacity retention than the Cu cell, in this example. The Cu cell exhibited an average CE of 97.3% over the course of 50 cycles, which led to a low capacity retention of 25.6% at the 50th cycle, in this example. Moreover, the 3D host cell maintained 49.1% capacity at its 100th cycle with a high average CE of 99.3%.

In various embodiments, since an anode free cell does not contain excess lithium, the average CE of the cell was calculated as the nth root of X, where the n is the cycle number and the X is the capacity retention at the nth cycle. Note this efficiency is higher than the average CE of a Li metal cell where Li is only partially cycled. In that case, a fixed amount of Li is cycled during each cycle and CE is averaged over multiple cycles. As far as its performance in Li metal anode batteries with high voltage cathodes, for example, classical layered oxides, Li-rich layered oxides, and high voltage spinel, based on the result may be incorporated into several embodiments.

Figure 8:
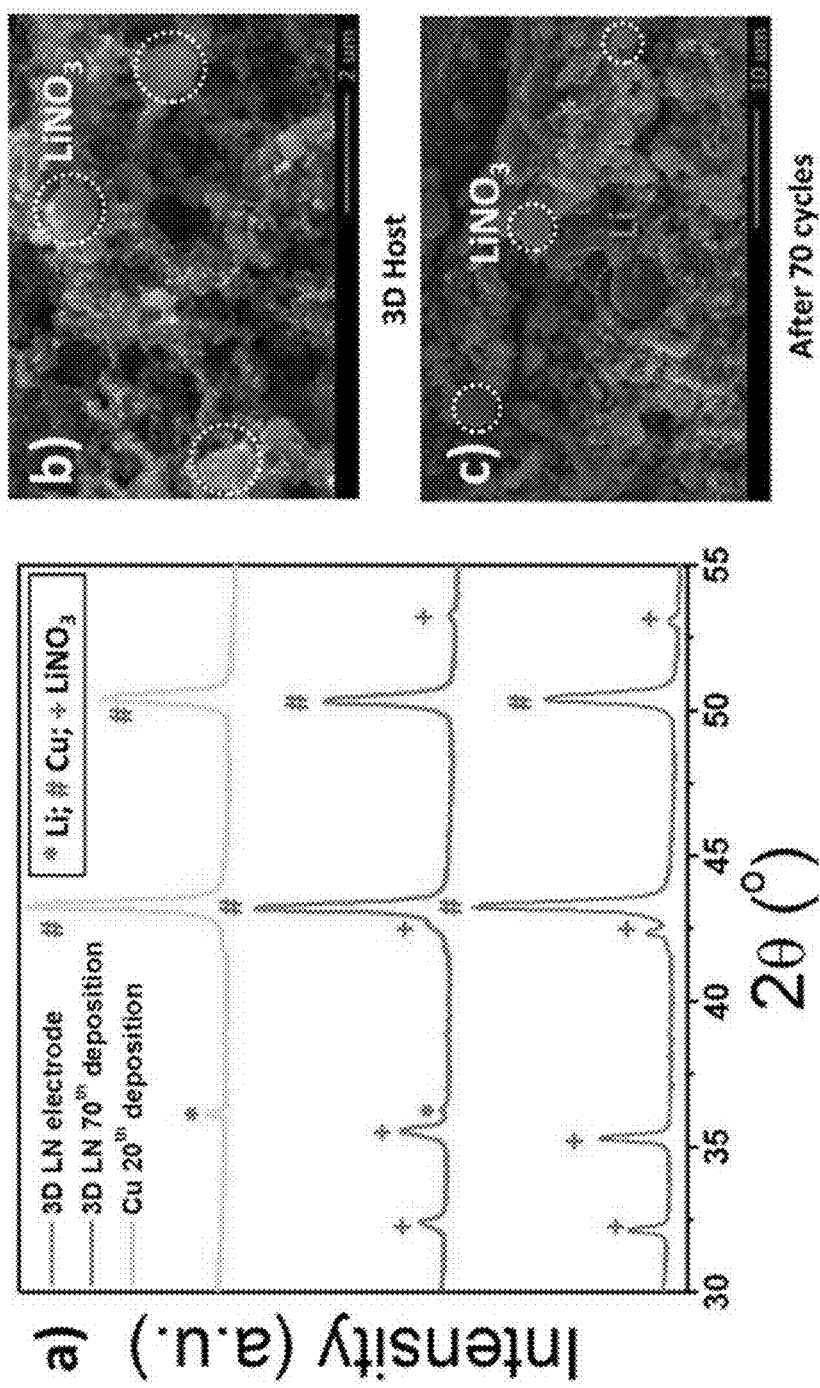
FIG. 8 illustrates example graphs comparing the presence of reserved $LiNO_3$ in different hosts, in accordance with various embodiments.

The influence of both the 3D host structure and the abundant LiNO$_3$ reserve is further illustrated with two control experiments. In one example, 3D host electrodes without LiNO$_3$ were prepared and compared with the bare Cu and 3D LiNO$_3$ host. The CEs were tested at 0.5 mA cm$^{-2}$ for 1 mAh cm$^{-2}$. Research has revealed that 3D porous electrode with only carbon and PVDF would not lead to the superior performance without LiNO$_3$. On the other hand, benefiting from the VC and LiNO$_3$ SEI formation additives, the initial Li deposition on bare Cu was dense and full of chunks. However, due to the low solubility of LiNO$_3$ in the carbonates, it was consumed to passivate the freshly deposited Li surfaces during repeated stripping and plating of Li metal. Once the LiNO$_3$ in the electrolyte was consumed, the dendritic Li can start to form. As a comparison, the 3D composite host can not only work as a conductive host to mitigate the volume expansion, but also can supply the LiNO$_3$ additive to the electrolyte. FIG. 8 illustrates example graphs comparing the presence of reserved LiNO$_3$ in different hosts, in accordance with various embodiments. That is, FIG. 8 demonstrates the LiNO$_3$ particles was well retained inside the host after long term cycling. Consequently, big Li chunk morphology with compact depositions was maintained, which can lead to the high CE. Moreover, the Li$_3$N and LiN$_x$O$_y$ signal on the surface of 3D LiNO$_3$ composite electrode was more prominent, which suggested the 3D LiNO$_3$ composite electrode supplied the LiNO$_3$ additive to the electrolyte. In addition, the LiNO$_3$ peak at 407.4 eV clearly showed the existence of LiNO$_3$ in the 3D composite host after 70 cycles, which is consistent with observations from XRD and SEM. FIG. 8C illustrated that the LiNO$_3$ particles was well retained inside the host after long term cycling. Consequently, big Li chunk morphology with compact depositions was maintained, which led to the high CE.

Figure 9:
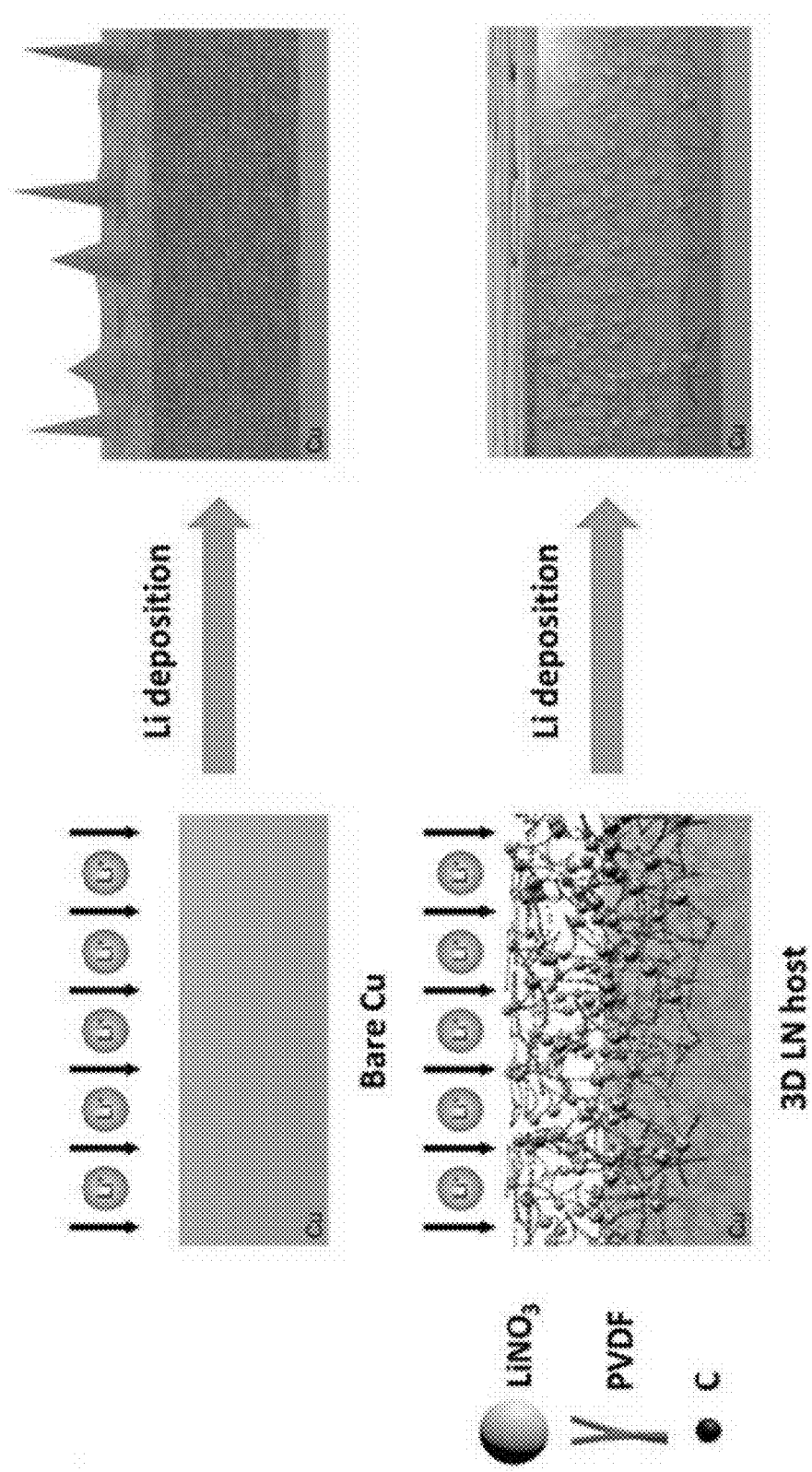
FIG. 9 illustrates an example schematic of Li plating/stripping on 3D $LiNO_3$ composite host, in accordance with various embodiments.

FIG. 9 illustrates an example schematic of Li plating/stripping on 3D LiNO$_3$ composite host, in accordance with various embodiments. That is, FIG. 9 illustrates an example working mechanism of the 3D composite host. The carbon black in the host can provide an electronic conductive network to reduce the local current density and serve as a substrate for Li deposition. The LiNO$_3$ can serve as reserved additives. The PVDF binder can hold all the components together to form the robust porous structure.

Figure 10:
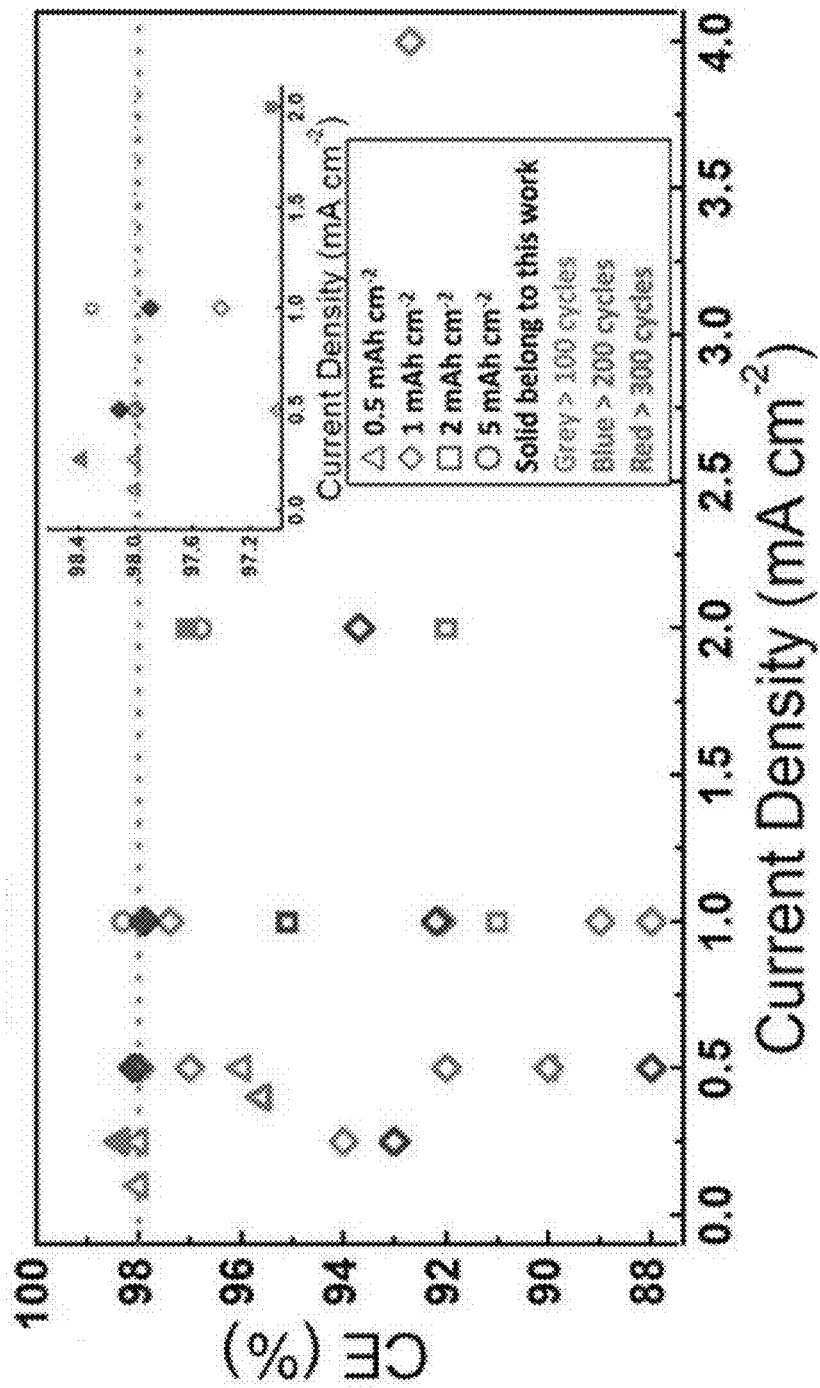
FIG. 10 illustrates an example summary of the Li metal anode coulombic efficiencies in carbonate-based electrolytes, in accordance with various embodiments.

FIG. 10 illustrates an example summary of the Li metal anode coulombic efficiencies in carbonate-based electrolytes, in accordance with various embodiments. That is, to provide context to the benefits that flow from the presently disclosed technology, a summary of sample Li metal anode coulombic efficiencies in carbonate-based electrolytes was plotted and compared in FIG. 10. The CE tests in most of the related references are conducted at current densities of less than 1 mA cm$^{-2}$ and the Li deposition capacities are lower than 1 mAh cm$^{-2}$. The CEs of Li in the carbonate electrolytes are usually less than 96%. The solid symbols represent the CEs that are achieved in the presently disclosed technology. A high CE of 98.4% is reached at a moderate current density of 0.25 mA cm$^{-2}$. At a high current density of 2 mA cm$^{-2}$, the CE remains above 97%.

Figure 11:
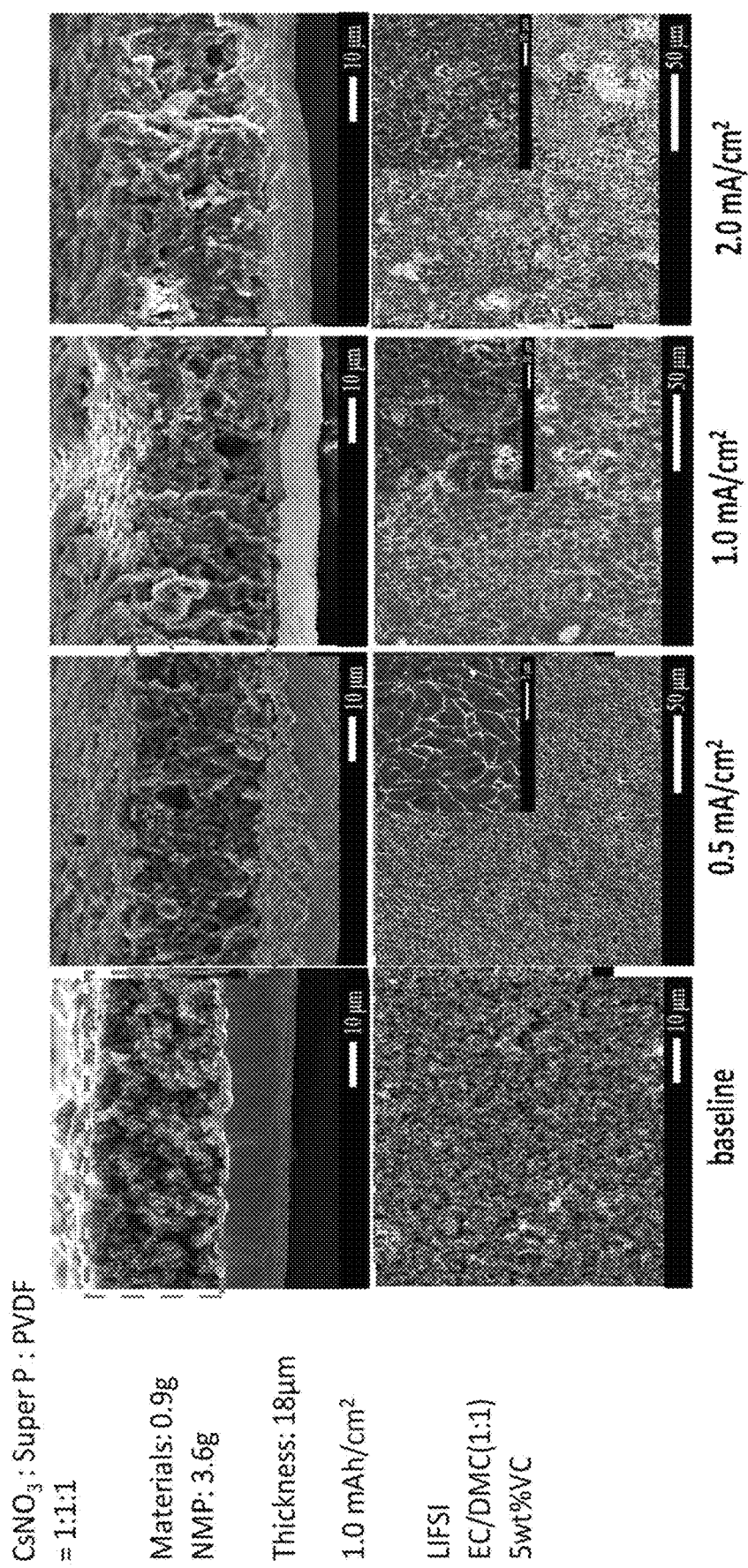
FIG. 11 illustrates sample SEM images of lithium deposit with 3D carbon with $CsNO_3$, in accordance with various embodiments.
Figure 12:
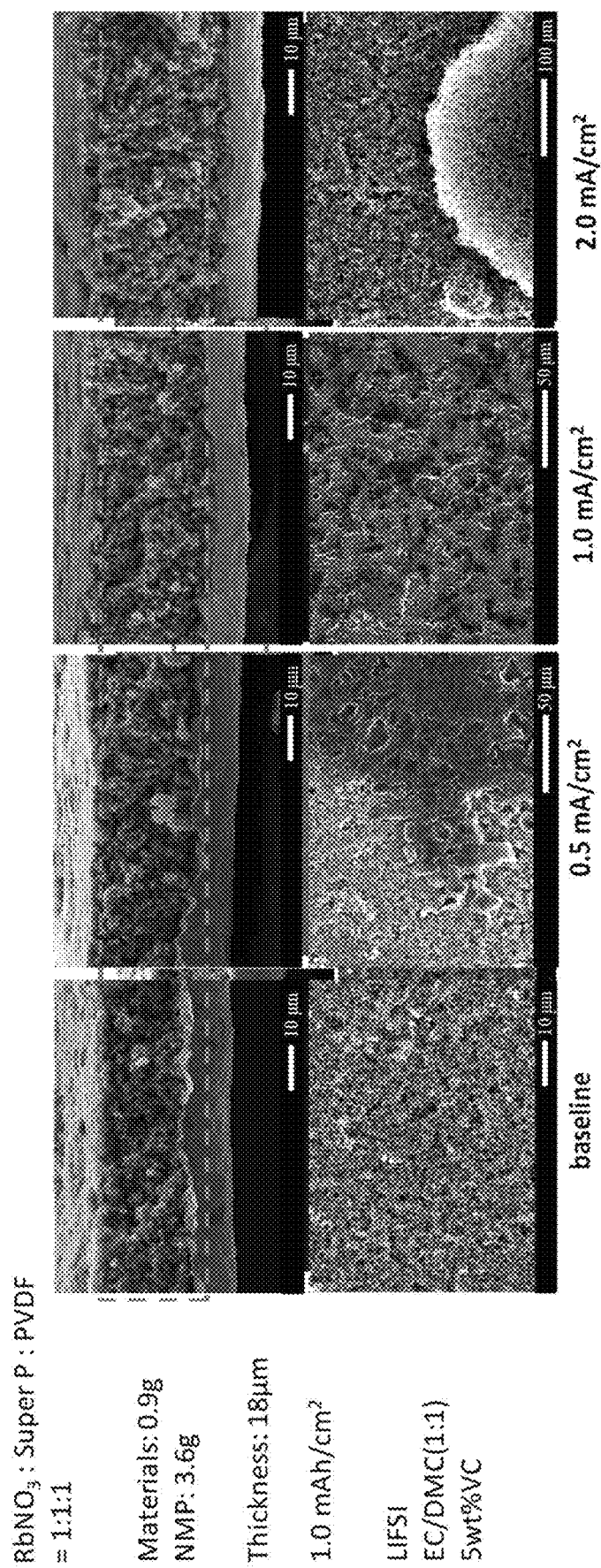
FIG. 12 illustrates sample SEM images of lithium deposit with 3D carbon with $RbNO_3$, in accordance with various embodiments.
Figure 13:
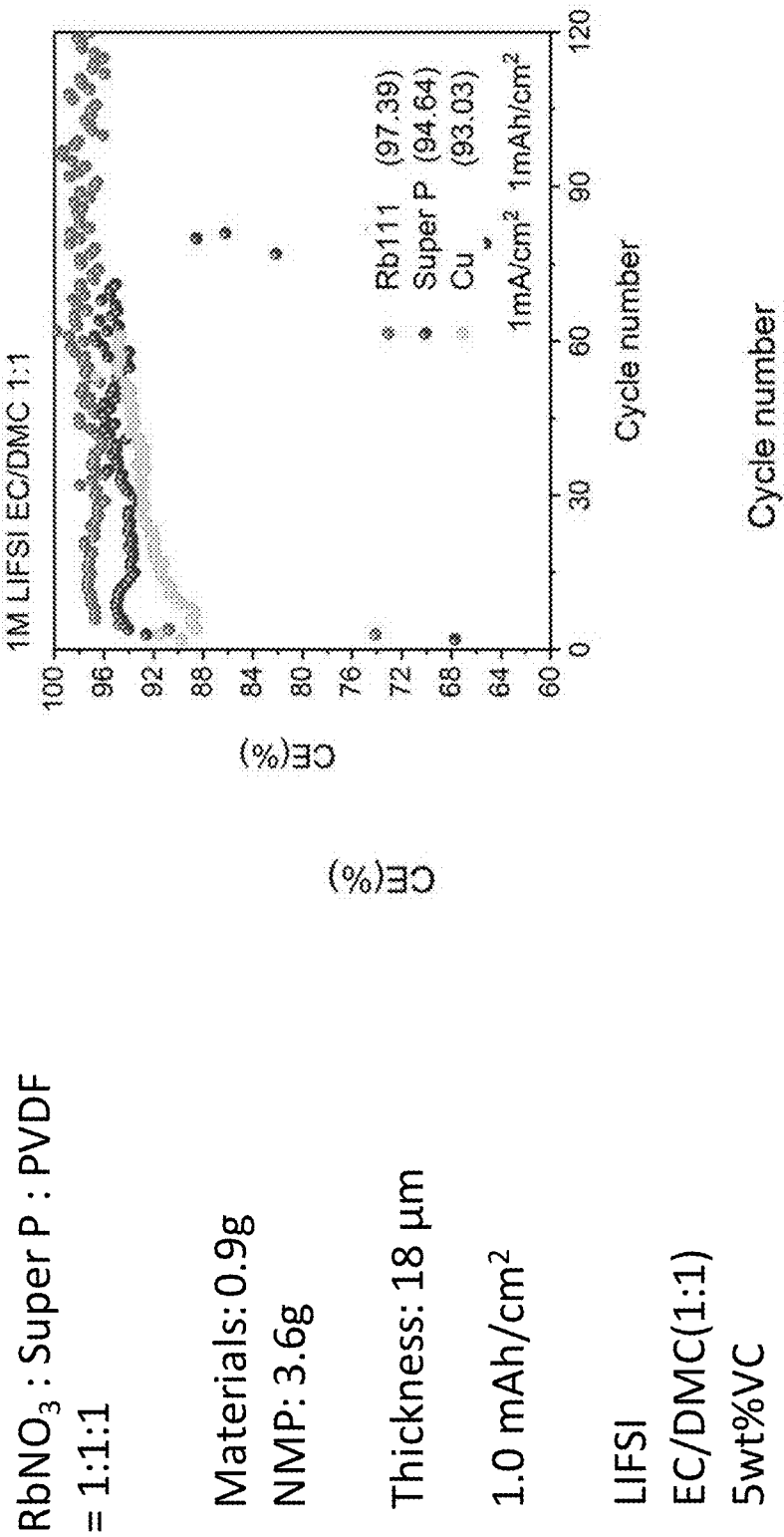
FIG. 13 provides a sample graph depicting the electrochemical performance of 3D carbon with $RbNO_3$, in accordance with various embodiments.

Notably, in further embodiments, 3D current collectors for the lithium metal anodes can include 3D carbon with CsNO$_3$ or RbNO$_3$ that may lead to even greater coulombic efficiency. FIGS. 11 and 12 illustrate sample SEM images of lithium deposit with 3D carbon with CsNO$_3$ and RbNO$_3$, respectively, in accordance with various embodiments. As shown, 3D carbon with CsNO$_3$ can benefit lithium deposit inside 3D carbon while triggering lithium dendrite formation outside 3D carbon. Similarly, 3D carbon with RbNO$_3$ can also enhance lithium deposit inside 3D carbon as well as provide uniform lithium particles outside 3D carbon. FIG. 13 provides a sample graph depicting the electrochemical performance of 3D carbon with RbNO$_3$, in accordance with various embodiment in which the increased coulombic efficiency of 3D carbon with RbNO$_3$ is highlighted. Therefore, as demonstrated by FIGS. 11-13, RbNO$_3$ can attract more lithium to deposit into 3D carbon, RbNO$_3$ can develop morphology of lithium depositions, and RbNO$_3$ may lead to higher coulombic efficiency.

Figure 14:
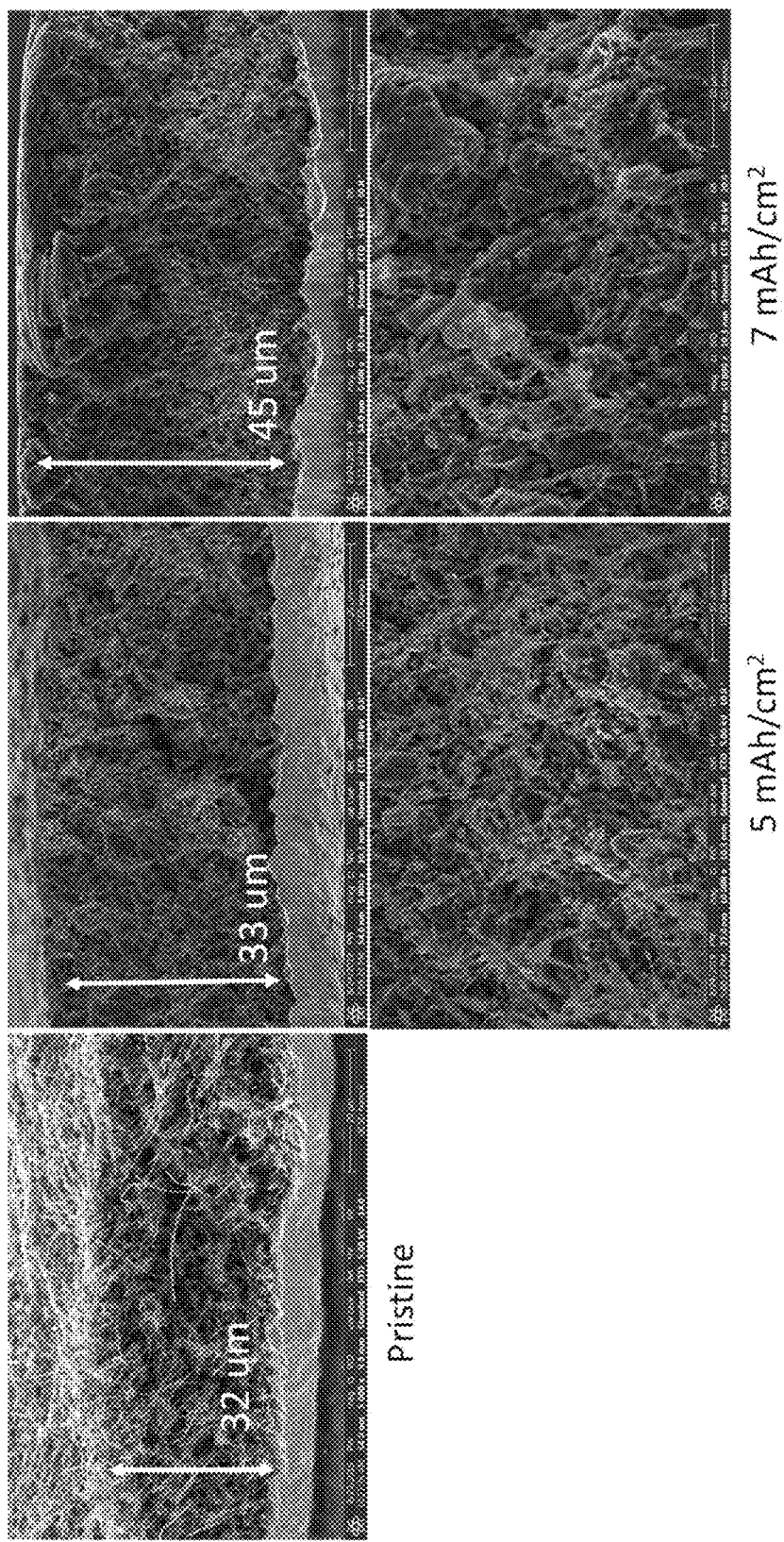
FIG. 14 provides a sample SEM images of lithium deposit with 3D VGCF (vapor grown carbon fiber) with $LiNO_3$, in accordance with various embodiments.

Notably, in further embodiments, 3D current collectors for the lithium metal anodes can include LiNO$_3$ with 3D VGCF (vapor grown carbon fiber) that may lead to even greater coulombic efficiency and larger capacity. FIG. 14 illustrates sample SEM images of lithium deposit with 3D VGCF with LiNO$_3$, in accordance with various embodiments. As shown, 3D VGCF with LiNO$_3$ can benefit lithium deposit inside 3D VGCF while triggering lithium dendrite formation outside 3D VGCF. Therefore, as demonstrated by FIG. 14, VGCF can attract more lithium to deposit into 3D VGCF, and lead to higher porosity and capacity.

CONCLUSION

In summary, a novel multi-functional 3D composite host can be designed for Li metal anode. Due to the robust structure and supplement of the LiNO$_3$, dense Li chunks instead of dendrites can be formed and retained after repeated Li plating and stripping at a current density of 2 mA cm$^{-2}$. As a result, the coulombic efficiencies of Li metal on the 3D composite host may be reasonably high in the carbonate electrolyte. A high coulombic efficiency of 98.4% can be achieved at 0.25 mA cm$^{-2}$ for a long cycling duration of more than 1200 h. The fabrication process of the 3D host can be easily scaled up by battery manufacturers. The disclosed technology provides a new route of designing low-cost 3D Li metal for high energy density safe batteries.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An electrode comprising:
   solid $LiNO_3$ dispersed within a liquid carbonate electrolyte, wherein the solid $LiNO_3$ is undissolved in the liquid carbonate electrolyte.

2. The electrode of claim 1, wherein the liquid carbonate electrolyte comprises vinylene carbonate (VC).

3. The electrode of claim 1, wherein the electrode further comprises $LiNO_3$ dissolved within the liquid carbonate electrolyte until saturation.

4. The electrode of claim 1, further comprising a binder selected from a group of compounds consisting of PVDF, PTFE, PVDF-HFP, CMC, and SBR.

5. The electrode of claim 1, further comprising a conductive additive comprising an electronic conductor selected from a group consisting of carbon black, carbon nanotubes, carbon fibers, vapor grown carbon fiber, graphite, and graphene.

6. The electrode of claim 1, further comprising a soluble salt selected from a group consisting of $LiClO_4$, LiCl, $LiPF_6$, LIFSI, and LITFSI.

7. An electrode comprising:
   solid $LiNO_3$ dispersed within liquid vinylene carbonate (VC), wherein the solid $LiNO_3$ is undissolved in the liquid VC.

8. The electrode of claim 7, wherein the electrode further comprises $LiNO_3$ dissolved within the liquid VC until saturation.

9. The electrode of claim 7, further comprising a binder selected from a group of compounds consisting of PVDF, PTFE, PVDF-HFP, CMC, and SBR.

10. The electrode of claim 7, further comprising a conductive additive comprising an electronic conductor selected from a group consisting of carbon black, carbon nanotubes, carbon fibers, vapor grown carbon fiber, graphite, and graphene.

11. The electrode of claim 7, further comprising a soluble salt selected from a group consisting of $LiClO_4$, LiCl, $LiPF_6$, LIFSI, and LITFSI.

* * * * *